Patented Dec. 15, 1931

1,836,265

UNITED STATES PATENT OFFICE

JOHN D. McBURNEY AND EDGAR H. NOLLAU, OF NEWBURGH, NEW YORK, ASSIGNORS TO E. I. DU PONT DE NEMOURS & COMPANY, OF WILMINGTON, DELAWARE, A CORPORATION OF DELAWARE

NON-LIVERING COATING COMPOSITION

No Drawing.   Application filed July 22, 1927.   Serial No. 207,813.

This invention relates to the prevention and overcoming of livering in coating compositions having a drying oil base, the invention having application both to pigmented and unpigmented compositions. The invention has particular application to paints and varnishes having a base such as linseed oil or China wood oil.

In the art of drying-oil compositions there is great difficulty experienced due to livering or gelling of the compositions. This livering is a well recognized phenomenon and is entirely different from phenomena such as precipitation of the pigment, oxidation of the oil, "puffing", thickening, etc. It is manifested by a gelation or setting of the entire body of the composition, resulting in a mass having somewhat the appearance of liver. It is peculiarly distinguished by the fact that the livered mass is not capable of liquefaction by the addition of materials, such as turpentine and the like, which are commonly used as thinners and solvents.

We have now found that not only can compositions be prepared which will not liver, but, furthermore, we have found that already livered compositions can be brought back to proper condition, that is de-livered. It is a major object of the invention to provide non-livering compositions of the general character indicated. It is a further object to provide a method for preventing the livering of drying-oil compositions and a method of de-livering livered compositions. It is a yet further object to provide pigment mixtures which, when added to drying-oils and drying-oil compositions, will give compositions which will not liver. To these ends and also to improve generally upon compositions, methods and mixtures of the character indicated, our invention consists in the various matters hereinafter described and claimed.

We have found that livering of drying-oil compositions may be controlled by proper adjustment of the hydrogen ion concentration of the compositions. In accordance with the invention, then, there is used in the composition a substance having such a dissociation constant that the hydrogen ion concentration of the composition is held within proper limits.

By way of example, but not in limitation, the following specific examples are given to show the substance of the present invention:

*Example 1.*—A livered mass of Van Dyke brown in Japan, having a composition as follows:

| | Per cent |
|---|---|
| Grinding Japan | 52.0 |
| Lake coloring | 43.2 |
| Silicious matter | 4.8 | had gelled to such an extent that the material had to be cut from the container, whereas, normally, the consistency of this material permits it to flow from the can. This material failed to be reliquefied upon the addition of the following solvents; ethyl acetate, ethyl alcohol, benzol, naphtha and turpentine. However, when the mass was treated by the addition of 1% of citric acid (percentage based on the total weight of treated material), the mass was liquefied to its original fluid conditions. The same results were obtained by the use of 1% of tartaric acid in place of the citric acid. Some samples of this material, after being reliquefied, have shown no tendency to re-liver after standing for over one year.

*Example 2.*—A sample of livered red oxide paint ground in linseed oil which could not be reliquefied by the addition of gasoline, alcohol, benzene, naphtha, or turpentine, was liquefied by the addition of about 1% of tartaric acid or about 1% of citric acid to the livered mass. The citric acid was introduced with a small amount of alcohol in order to hasten de-livering by facilitating mixing of the acid with the livered mass.

*Example 3.*—Samples of livered clear varnish which were quite thick and showed the elastic properties characteristic of livered material were treated separately with dry tartaric, citric and malic acids. These de-livering agents were finely powdered and screened through a 60 mesh sieve before being added to the livered material. By employing the dry material, the effect of dilution from the use of even a small quantity of solvent was eliminated. The addition of 1% of a dry tartaric acid resulted in a noticeable softening of the livered varnish after one hour. After standing twenty-four hours the entire dispersion was fluid. It was found that the addition of 0.5% of tartaric acid resulted in a similar behavior, as did also citric and malic acids added in the same quantities. In the cases of the smaller amounts, however, a longer time was required to effect complete reliquefication.

*Example 4.*—The ordinary lithographing or printing inks contain boiled linseed oil and some suitable pigment, such as carbon black. In many instances, these dispersions of pigment in the oil tend to stiffen and resemble a liver. It has been found that with the addition of our de-livering agents within the range covered by the present invention, there results a product of much greater fluidity, and in comparison with suitable control samples, the tendency to liver is prevented.

*Example 5.*—It was found that compositions comprising zinc oxide dispersed in drying oil and containing about 1% of one of our de-livering agents, did not liver after standing, as compared with suitable control samples which did not contain our de-livering agents.

Generally speaking, the range of hydrogen ion concentration which will fully inhibit livering of drying oil compositions may be said to be developed by those substances whose dissociation constant (represented by $P_{Ka}$) lies between about 1.0 and 3.4, preferably in the neighborhood of 3.1. The quantity of hydrogen ions developed by the secondary or tertiary dissociation of polybasic acids may be ignored for practical purposes. In the case of pigmented compositions, the necessary hydrogen ion concentration is generally independent of the particular pigment, so that it is only in those cases wherein some property other than fluidity is in question that consideration need be given to what particular livering preventive is used with a particular pigment.

For the purpose of preventing, or overcoming, livering the amount of preventive used is not generally important. That is to say, it is important to use a preventive (e. g. an acid) having a dissociation constant within the specified range but the effect obtained is, for practical purposes, not dependent on the amount of the preventive that is used. Even though there be a point of extreme dilution where increasing amounts would have better effects, yet this point would correspond to such small amounts of preventive that they would not be practical amounts to work with in factory or even laboratory operations. Still, for practical reasons, it is desirable to use at least such an amount of preventive that the preventive may be mixed into a specified amount of solution quickly, since if too little is used it will take a considerable time to distribute the preventive properly throughout the mass. Conversely, if an unduly large amount of preventive is used it might be that this amount would have a deleterious effect on the composition as a whole, or on the pigment in pigmented compositions. Generally speaking, and in view of these and other considerations, we prefer to use substantially between 0.1% and 5% of preventive, preferably substantially between 0.2% and 3% of preventive based on the total weight of the untreated composition to be protected, or to be reliquefied; but, as indicated above, so far as the effect of the preventive as such is concerned, the amount may be less than 0.1%, and a material excess is not usually detrimental.

As has been pointed out, the invention is equally applicable to the prevention of livering in compositions as originally prepared, and to the complete de-livering, and subsequent prevention of the livering of, compositions that have livered. In both cases the same preventives in substantially the same percentages may be used. The livering preventives may be added, in either case, in any desired manner resulting in a proper dispersion thereof in the composition.

Where but temporary improvement only is necessary, substances may be used which have a dissociation constant as low as 1.0 or even slightly lower. This is illustrated specifically in the case of oxalic acid ($P_{Ka}$ equals 1.0) with which a temporary retardation of livering may be effected and a partial reliquefication of the livered material realized. In view of this, although for simplicity reference is made in the claims to "non-livering" compositions, "preventive" of livering, etc., it is to be understood that such terms are not to be taken as limited to compositions which are fully non-livering unless clearly so indicated.

It has further been found that our invention may be practiced by the addition of the various livering preventives to the pigment itself. This gives a pigment composition which, when used in making up coating compositions with drying oils, etc., results in coating compositions which will not liver on standing. In preparing such a pigment mixture, it is merely necessary to mix the dry pigment with such an amount of dry preventive as will be sufficient to give to the finished coating composition the desired percentage of livering preventive.

Although particular reference has been made to certain substances as preventives for livering, it is to be understood that other suitable substances may be used which result in development of the desired and proper hydrogen ion concentration. The preventive may be any suitable substance having the proper dissociation constant ($P_{Ka}$ between and including 1.0 and 3.4) and compatible with the composition with which it is to be used, for example, tartaric, citric, or malic acids, etc. As has been pointed out, the quantity of preventive used may also be varied within wide limits. Such other suitable changes and modifications may be made without departing from the spirit and scope of the invention.

We claim:

1. A non-livering drying-oil coating composition containing an acid having a dissociation constant substantially between 1. and 3.4.

2. A non-livering drying-oil coating composition, said composition containing an acid for adjusting the hydrogen ion concentration of the composition and having a dissociation constant substantially between 1. and 3.4, said acid being present in the proportion of from 0.1% upward, based on the total weight of the composition.

3. A non-livering drying-oil coating composition, said composition containing an acid for adjusting the hydrogen ion concentration of the composition and having a dissociation constant substantially 3.1.

4. A non-livering drying-oil coating composition, said composition containing an acid of the group which consists of citric, malic, and tartaric acids, for adjusting the hydrogen ion concentration of the composition.

5. The method of preventing livering of a drying-oil coating composition which comprises adding thereto an acid having a dissociation constant substantially between 1.0 and 3.4.

In testimony whereof we affix our signatures.

JOHN D. McBURNEY.
EDGAR H. NOLLAU.